March 23, 1943.  R. FENNEMA  2,314,489
GLAND BOLT RETAINER
Filed May 7, 1941  2 Sheets-Sheet 1

Inventor:
Richard Fennema
By Joseph O. Lange
Atty.

March 23, 1943.  R. FENNEMA  2,314,489
GLAND BOLT RETAINER
Filed May 7, 1941  2 Sheets-Sheet 2
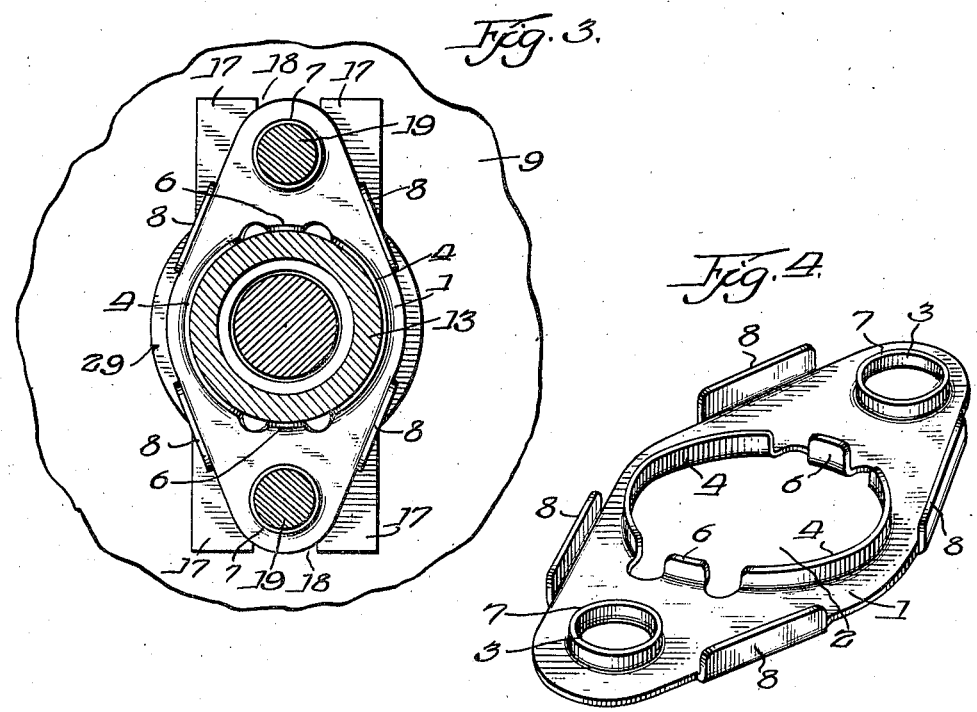
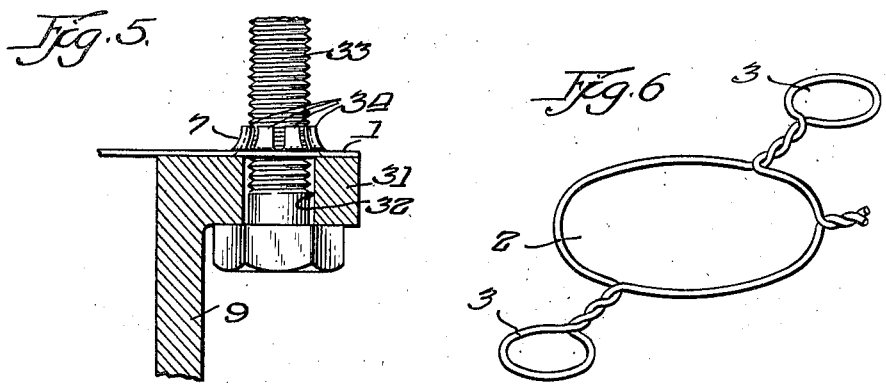
Inventor:
Richard Fennema
By Joseph O. Lange, Atty.

Patented Mar. 23, 1943

2,314,489

UNITED STATES PATENT OFFICE 2,314,489

GLAND BOLT RETAINER

Richard Fennema, Chicago, Ill., assignor to Crane Co., Chicago, Ill., a corporation of Illinois Application May 7, 1941, Serial No. 392,217

5 Claims. (Cl. 286—33)

At the outset, in acquiring a proper understanding of the background of my invention, it should be realized that in connection with such journaled members as valve stems, pump rods, motor shafts and the like, where the leakage of fluid past a reciprocable or rotatable rod must be prevented, it is customary to provide a packing of some kind for this purpose, the packing being generally compressed by threaded means, usually a pair or more of gland bolts or gland bolt studs which, upon being tightened, draw or force a tubular member or gland into the packing chamber to thus compress the packing and force it into fluid sealing contact with all avenues of fluid escape. From the standpoint of compactness, it is generally desirable that these gland bolts extend as short a distance as possible from the journaling member or housing. The usual method of attaching the bolts to the housing is to provide an apertured ear or boss for each bolt while a further compact method consists of screwing gland bolt studs into suitable threaded openings in the housing. However, the latter method of attachment has two inherent disadvantages: first, the bolt studs extending outward from the housing adjacent the packing joint reduce accessibility to it and thus interfere with repacking, and secondly, there is the probability that the bolt studs may become frozen within the threaded openings in the housing by rust or excessive tightening and may easily shear off when being turned. From the standpoints of compactness and disassembly, a third method has been utilized in which pairs of spaced ears or lugs on the housing provide for slots or grooves in which the gland bolts are fitted, these bolts preferably having T heads which interlock with the underside of the ears, the opposite end of the bolts being supplied with threaded nuts and extending through apertures or slots in the gland or in a separate flange member frequently used to back up the gland in the larger sizes. One serious objection has been experienced with this method of attachment, however, in that occasionally, when the nuts may become loosened due to vibration or for some other reason are being removed, the T-headed bolts will slip transversely out of the slots and further vibration may cause the nut to become detached and both the nut and the bolt may be lost with serious consequences resulting from the fully loosened packing and the consequent loss of fluid, lubricating oil, etc. It should be realized that valves and pumps or the like are frequently located at relatively high and inaccessible locations and the fall of the bolt may constitute a serious hazard to persons passing below. Accordingly my invention is concerned particularly with remedying these objections, that is the present tendency of stuffing box bolts to slip out of their proper position with resultant loss of fluid and the other danger referred to.

A principal object of my invention lies in the provision of securing means for maintaining packing or stuffing box bolts in their proper places regardless of the loosening or removal of their corresponding nuts.

Another object lies in the provision of an economical sheet-formed or otherwise formed wire fixture adapted to grip the stuffing box bolts, thereby preventing their accidental removal or loss.

Another purpose is to provide a novel bolt-retaining member adapted to exert sufficient grasping force upon packing gland bolts to maintain the latter in place without their respective nuts while either replacing or repairing the packing and shifting the gland.

Another object is the provision of an apertured plate or a formed wire device or the like adapted to align the packing gland bolts with corresponding retaining holes or slots.

Other objects as well as additional advantages of my invention will be apparent in the following detailed description of the drawings illustrating two modifications of my device and in which Fig. 1 is a fragmentary sectional view of a journaling device employing one modification of my invention.

Fig. 3 is a plan sectional view taken on the line 3—3 of Fig. 2.

Fig. 4 is a perspective view of the modification of my invention illustrated in Fig. 1.

Fig. 5 is a fragmentary sectional view showing a modification of a portion of the device shown in Fig. 4.

Fig. 6 is a perspective view of a further modification.

Like parts are referred to by like numerals throughout the several views.

Figure 1:
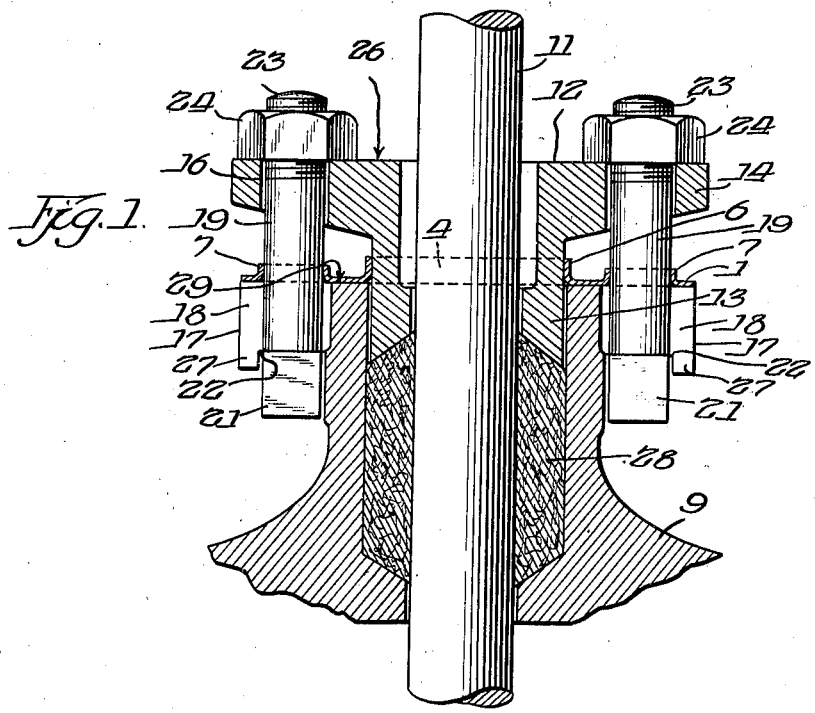

Referring now more particularly and in detail to the drawings, the retaining device comprising one form of my invention as shown in Fig. 4 is of a suitably formed sheet made either as a stamping, forging or a casting and generally designated 1 having a centrally located aperture 2 flanked by the extension on either side having a pair of relatively smaller end apertures 3. The central aperture 2 is surrounded by a discontinuous cylindrical portion consisting of arcuate sections 4 and 6 adapted to maintain a flexible grip on the lower shank 13 of the packing gland 12 as shown more clearly in Fig. 1. The apertures 3 are preferably surrounded by the continuous cylindrical portions 7 which, if desired, are also adapted to grip a substantial portion of the gland bolts, the outside periphery of which is flanged at a plurality of locations to form axially extending strengthening sections or ribs as at 8.

Figure 2:
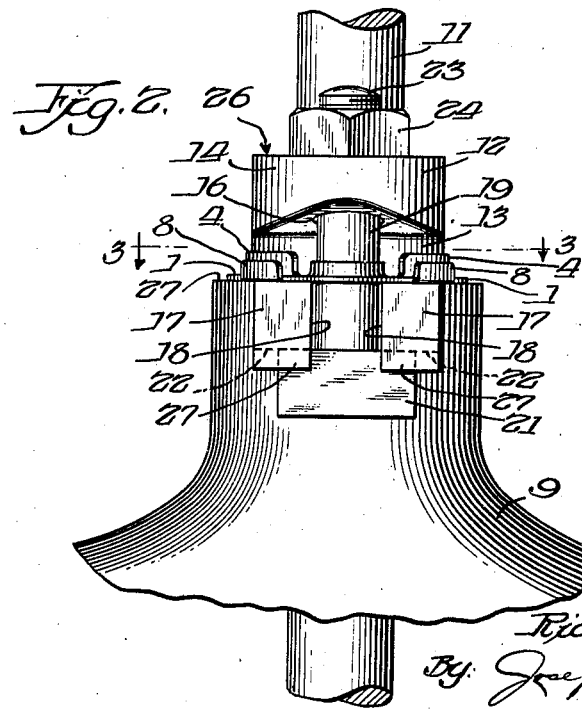
Fig. 2 is an outside view of Fig. 1 taken at a right angle to the view in Fig. 1.

As indicated in Figs. 1, 2 and 3, the journaling member of housing 9 may be a portion of a valve bonnet, pump cylinder, motor housing or the like, and the journaled member or rod 11 may correspondingly be a valve stem, piston rod, motor shaft or the like. The gland previously referred to as 12 consists of the cylindrical portion or gland proper 13 and the integral gland flange 14 having the bolt holes 16 formed therein. Obviously the flanged portion 14 may be a separate part and such is often the case in practice without affecting the utility of my invention. A pair of spaced lugs or bosses 17 preferably formed on each side of the housing 9 have positioned therebetween axially extending slots 18 which form channels for the reception of the gland bolts 19. The bolts have the T heads 21 which normally bear against the undersurface 22 of the lugs 17 and having, at the opposite end the threaded portions 23 extending through the bolt holes 16. Threadedly attached thereto, the nuts 24 normally bear upon the upper surface 26 of the gland. The downwardly extending lip 27 on the outward end of each lug 17 functions to prevent the outward movement or slippage of each T head 21 when bearing against the lug undersurfaces 22. The usual stuffing box packing 28 is provided between the rod 11 and the housing 9 whereby upon tightening of the nuts 24 the packing gland 12 is urged downwardly with consequent flexible distortion of the packing 28 into fluid sealing contact with both the rod 11 and the bore of the housing 9.

The retaining device 1, comprising one form of my invention, is employed as illustrated in Figs. 1, 2 and 3 in which it is shown supported upon the upper surface 29 of the housing 9 with the cylindrical rim portions 7 surrounding the bolts 19 and with the arcuate sections 4 and 6 fitted around the cylindrical shank portion 13 of the gland 12. The raised portions 4, 6, 7 and 8 of the retaining device may point upwardly or downwardly as shown, or inwardly if preferred, there being no substantial difference in the satisfactory results achieved by the different orientations thereof. Likewise, it is not essential that the retaining device actually rest upon the housing surface 29 as it will serve its purpose equally well in preventing outward or transverse movement of the bolts if located in any position between the housing and the gland. It will usually be preferable, but not essential, however, that the retaining device fit snugly around the bolts 19 or the gland 12, or both, in order that it may stay in place without chattering or unduly vibrating. It should be obvious of course that my invention is not limited to utilization with the specific type of bolt means shown for it may likewise be used to great advantage with the type wherein closed apertured ears are formed on the housing through which conventional bolts are extended, as contrasted with the type shown in which slots formed on the housing cooperate with specially formed T head bolts. With the latter conventional type, while there is no danger of losing the bolts by accidental transverse movement (since the apertures on the housing are closed, instead of slotted) my device may however be used advantageously in preventing axial movement of the bolts under influence of vibration, and possible ultimate loss. In this latter connection the gripping action of the retaining device comprising my invention may be enhanced by forming the cylindrical portions 7 of the retaining device so that they fit very snugly around the bolts 19. The grip may be made even better by roughening the outside surface of the bolt 19 in such a manner that downward movement is resisted by the retaining device 1. Its value in this respect may also be further increased by constructing the cylindrical portions 7 in the form of a number of arcuate and axially-extending flexible finger portions and by forming the bolts 19 with threads extending down through these flexible finger portions on the retaining device in such a manner that the threads are engaged by the fingers. Such a modification is shown in Fig. 5 where the housing portion is again designated as 9 and has the ears of lugs 31 (only one shown) and an opening 32 formed in each lug. A bolt stud 33 extends upwardly through each opening 32 and through the cylindrical portions 7 which are composed of individual arcuately extending flexible finger portions 34 which press against the threaded surface of the bolt-stud 33 and in such a manner as to permit its upward movement but which resist its downward movement.

In view of the foregoing description of my invention and its objects and advantages it should now be apparent to anyone skilled in this art that in many circumstances satisfactory results may likewise be obtained by a form of my invention such as Fig. 1 which omits the extended portions 4, 6, 7 and 8; in fact, any similar means for retaining the gland bolts or bolt studs will be within the spirit of my invention, for instance a simplified form of my device is illustrated in Fig. 6 which consists merely of a length of wire looped in such a manner as to provide the apertures 2 and 3 which fit about the gland 12 and the gland bolts, respectively. The wire may be pre-formed in this manner or it may be wrapped or coiled into place after the packing joint has been completely assembled.

Having described my invention together with a few of the several forms which it may assume, it is the desire not to be limited to the specific forms disclosed but only within the spirit and scope as defined in the appended claims.

I claim:

1. A packed joint comprising a journaling member, a journaled member, said members having interposed therebetween a chamber containing packing, a gland extending into said chamber, screw means connecting said journaling member and said gland and adapted to urge said gland into said chamber and compress said packing, a relatively thin apertured means independent of said journaling or journaled member peripherally and snugly engaging said screw means and said gland, and adapted to maintain the said screw means in substantially predetermined spaced-apart relation with respect to the longitudinal axis of the said journaling member.

2. A packed joint comprising a housing and a movable shaft or stem having interposed therebetween a packing chamber, a gland extending into said chamber, threaded means connecting said journaling member and said gland and adapted to urge said gland into said chamber and compress said packing, a wire formed apertured means separate from said housing and movable shaft frictionally engaging a transversely fixed portion of said packing joint and the said threaded means whereby the latter means are maintained in predetermined spaced-apart relation with respect to said fixed portion to prevent substantial axial movement of the threaded means.

3. A packed joint comprising a journaling member, a journaled member, said members having interposed therebetween a chamber containing packing, a gland extending into said chamber, threaded means connecting said journaling member and said gland and adapted to urge said gland into said chamber and compress said packing, a plate-like apertured frame means independent of said journaled and journaling members, the said frame means having castellated projections around the apertures adapted to frictionally engage said threaded means and a fixed portion of said journaled member in such manner that said threaded means may be readily moved into but not out of predetermined axial positions.

4. In a packed joint or the like, the combination comprising a housing, a shaft journaled within said housing, said housing and said shaft having interposed therebetween a packing chamber, a gland extending into the said chamber, a plurality of adjustable means connecting the said housing and the said gland adapted to urge the said gland into said chamber and to compress packing therewithin, plate-like peripheral support means independent of the said housing and said shaft snugly engageable with peripheral portions of the said adjustable means and with an annular surface of a fixed portion of the said joint for frictionally preventing substantial longitudinal movement of the said adjustable means.

5. A packing assembly for a valve or the like comprising a housing for a stuffing box, a gland therefor, a gland follower having apertures therearound, an outwardly extending annular flange at the upper end of the valve housing having notches therearound corresponding in position to the apertures in the said follower, bolts adapted to be positioned between and draw together the follower and housing, a plate-like position-retaining member for said bolts having an enlarged central aperture adapted to surround a portion of the said gland and having other apertures adapted to frictionally engage the said bolts.

RICHARD FENNEMA.